United States Patent Office 3,179,492
Patented Apr. 20, 1965

3,179,492
PURIFICATION OF CERTAIN REFRACTORY OXIDES
Thomas W. Smoot, Bethel Park, and Joseph R. Ryan, Irwin, Pa., assignors to Harbison-Walker Refractories Company, Pittsburgh, Pa., a corporation of Pennsylvania
No Drawing. Filed Apr. 30, 1963, Ser. No. 277,032
8 Claims. (Cl. 23—14.5)

This invention relates to the purification of certain refractory oxides. In a particular embodiment, it relates to the treatment of the stable oxides of the elements having the atomic numbers 39 through 41, 72 through 73, 90 and 91, 57 through 60, 63 and 64, 66 and 70, to remove certain relatively low melting point impurities therefrom.

Contemporary technology demands high purity materials. For example, there is a demand in the atomic reactor field for high purity zirconia, thoria, etc. These refractory oxides are often found associated with such impurities as $Fe_2O_3$, $Cr_2O_3$, $TiO_2$, and like materials, some of them having relatively low melting points, i.e. melting points below about 3000° F. Removal, or at least reduction, of these and similar impurities to acceptable levels, has been distressingly difficult. Accordingly, it is an object of this invention to provide improved methods of substantially removing or reducing certain impurities from stable refractory oxides, which oxides are characterized by a melting point of over 3000° F. It is another object of the invention to provide a method of removing $Fe_2O_3$, $Cr_2O_3$ and $TiO_2$ impurities from refractory oxides of the elements having the atomic numbers 39 through 41, 72 and 73, 90 and 91, 57 through 60, 63, 64, 66 and 70.

Briefly, according to one aspect of the invention, we intimately admix the refractory oxide or compound to be purified with a material of that group of inorganic materials which decompose below about 2500° F. to yield calcia and magnesia. This group would include the hydrates, chlorides, etc. Of course, pure calcia or magnesia is also used. This mixture is pressed into billets, which billets are hard fired at a temperature in excess of 3000° F. The temperature is held for a time period sufficient to induce reaction between the calcia and/or magnesia and the $Fe_2O_3$, $Cr_2O_3$, $TiO_2$, and like impurities, to form eutectics and phases which are mobile or fluid below 3000° F. In some manner, not completely understood, these mobile eutectics and phases are driven towards the center of the billet, where they form a zone of weakness roughly parallel to the long axis of the billets. When the billets are crushed, these impurity centers are easily separated from the surrounding and then purified refractory oxide. In the laboratory, we have successfully accomplished this purification by simply rough crushing, i.e. —6+28 mesh, of the billets and manually removing those off-color particles which contain the impurities.

In the following discussion, we use the terms "eutectic" and "phase" interchangeably to describe the material which, upon high temperature treatment, migrates to the zones of weakness.

A better understanding of the invention will be had by a study of the following detailed description with reference to specific examples. It should be understood these examples are not included by way of limitation but, rather, are set forth for purposes of explanation, and to teach those skilled in the art the best mode now known to us for the practice of our invention. Also, all sizes are according to the standard Tyler series, and all parts and percentages are by weight. All chemical analyses are on the basis of an oxide analysis, unless specifically mentioned to the contrary. Also, all analyses should be considered as typical.

Example 1

A sample batch was prepared which consisted of about 100 parts of unstabilized monoclinic zirconia and about 8 parts of calcium hydroxide. The zirconia was subjected to spectrochemical analysis to determine trace impurities. The following table sets forth the results (metal to metal basis given in parts per million):

Silicon _____ 39
Aluminum _____ 30
Iron _____ 360
Titanium _____ 300
Magnesium _____ 4.5
Chromium _____ 170
Manganese _____ 30
Calcium oxide [1] _____ 15

[1] Weight percent, and on the basis of an oxide analysis, of total zirconia batch.

The calcium hydroxide was U.S.P. grade. The ingredients were finely divided, i.e. —325 mesh, and were intimately admixed in a rubber lined ball mill, using a small proportion of zirconia balls to enhance mixing.

Bar-like shapes, about 2 x 3 x 14", were formed by isotatic pressing at 30,000 p.s.i. These bars were fired for about 10 hours at 3000° F.

The bars were cooled and crushed in a jaw crusher and rolls to approximately —10 mesh. Magnetic separation and hand sorting of off-color particles reduced the magnetic iron and other impurities. The purified particles were subjected to ball milling to obtain a —325 mesh powder which was subjected to spectrochemical analyses for trace impurities. The following table sets forth the results of this analysis (metal to metal basis given in parts per million):

Silicon _____ 69
Aluminum _____ 50
Iron _____ 125
Titanium _____ 100
Magnesium _____ 9.5
Chromium _____ 39
Manganese _____ 20
Calcium oxide [1] _____ 5.91

[1] Weight percent, and on the basis of an oxide analysis, of total zirconia batch.

The iron, titanium and chromium impurities were drastically reduced. There was also reduction in the quantity of manganese present. In fact, this analysis points out a surprising side benefit obtained in our method of purification. The calcium oxide content is precisely that required to stabilize the monoclinic zirconia batch ingredient. Further testing established that the zirconia was, in fact stabilized in the cubic crystalline state.

Thus, by our methods of treating zirconia, we not only reduce certain undesirable trace impurities but, at the same time, we also stabilize the zirconia.

Forming methods other than isostatic pressing are possible, as long as they are capable of forming self-sustaining shapes from the necessarily finely divided batch ingredients.

Further, higher firing temperatures with shorter hold periods and lower temperatures with longer hold periods are satisfactory. Firing temperature and hold time are variable; but the combination must be such as to accomplish the result of chemical reaction between a selected mineralizer (such as the calcium hydroxide mentioned above) and the impurities to be removed, to form a reaction product which has a eutectic and phase below the selected firing temperature. Further, the eutectic or phase must be mobile at the firing temperature. The hold time must be sufficient to complete the driving of the mobile eutectics and phases towards the center of the bodies being fired, and to concentrate the impurities at the center so they may be easily physically separated from the purified oxide envelope about them.

We mentioned magnetic separation and hand sorting to remove the magnetic iron and other impure particles. Such methods as froth or frothless flotation, heavy media separation, and other processes can be used, which are capable of distinguishing between the purified refractory oxide particles and the impurity-containing particles.

Further, while we mentioned 8 parts of calcium hydroxide in Example I, considerably lesser amounts of the selected mineralizer can be used. We used 8 parts in Example I, because of the beneficial side aspect of obtaining stabilized zirconia. Actually, the minimum usable amount should be slightly in excess of that which will be necessary to completely chemically react with the impurities to be removed to form the desired mobile eutectic.

*Example II*

We obtained what was considered a beneficiated rare earth oxide mixture, and subjected this to our beneficiation techniques. Our techniques still further beneficiated the mixture by removing substantially all of the iron, iron oxide, calcium, barium and silica impurities. It had an analysis typically as follows: metallic iron, calcium oxide, ferric oxide, silica and trace impurities—10%, the remainder 90%—rare earth oxides, as follows:

|  | Percent |
|---|---|
| $CeO_2$ | 47.1 |
| $La_2O_3$ | 24.6 |
| $Nd_2O_3$ | 12.6 |
| $Pr_6O_{11}$ | 4.35 |
| $Sm_2O_3$ | 0.70 |
| $Eu_2O_3$ | 0.15 |
| $Gd_2O_3$ | 0.21 |
| $Dy_2O_3$ | 0.05 |
| $Yb_4O_7$ | 0.01 |
| $Y_2O_3$ | 0.10 |

This mixture was intimately admixed with about 1 part of calcium oxide. All batch ingredients were —325 mesh. The batch was pressed into shapes on an isostatic press at about 20,000 p.s.i. The resulting bar-like shapes were about 2 x 3 x 14″. We fired the bars at 3000° F. for about 10 hours. After firing, the bars were removed, crushed to approximately —10 mesh, and the resulting grain was subjected to magnetic separation and hand sorting to remove the concentrated metallic and magnetic iron and off-color impure particles. Visual inspection indicated central portions of the bars to be distinctly different from the outer portions. These inner portions exhibited strong evidence that a low-melting phase or phases and/or eutectics had migrated to and collected in the central portion. Subsequent analyses showed the 10% impurities had been reduced to less than 1% of the total mixture.

*Example III*

To remove titanium, vanadium, chromium, manganese and iron impurities from a finely divided uranium oxide, a batch thereof is mixed with about 1 part, by weight, of calcium hydroxide, U.S.P. grade. The calcium hydroxide and uranium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

*Example IV*

To remove titanium, vanadium, chromium, manganese and iron impurities from a finely divided thorium oxide, a batch thereof is mixed with about 1 part, by weight, of calcium hydroxide, U.S.P. grade. The calcium hydroxide and thorium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

*Example V*

To remove titanium, vanadium, chromium, manganese and iron impurities from a finely divided hafnium oxide, a batch thereof is mixed with about 1 part, by weight, of calcium hydroxide, U.S.P. grade. The calcium hydroxide and hafnium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

*Example VI*

To remove titanium, vanadium, chromium, manganese and iron impurities from a finely divided tantalum oxide, a batch thereof is mixed with about 1 part, by weight, of calcium hydroxide U.S.P. grade. The calcium hydroxide and tantalum oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

*Example VII*

To remove titanium, vanadium, chromium, manganese and iron impurities from a finely divided ytterbium oxide, a batch thereof is mixed with about 1 part, by weight, of calcium hydroxide, U.S.P. grade. The calcium hydroxide and ytterbium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

*Example VIII*

To remove titanium, vanadium, chromium, manganese and iron impurities from a finely divided cerium oxide, a batch thereof is mixed with about 1 part, by weight, of calcium hydroxide, U.S.P. grade. The calcium hydroxide and cerium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

Since cerium may, under strong oxidizing conditions, form an unstable sequi-oxide, we suggest careful control of the air-fuel ratio to assure oxygen only slightly in excess of the stoichiometric amount necessary to burn the fuel used.

*Example IX*

To remove titanium, vanadium, chromium, manganese and iron impurities from a finely divided yttrium oxide, a batch thereof is mixed with about 1 part, by weight, of calcium hydroxide, U.S.P. grade. The calcium hydroxide and yttrium oxide are intimately admixed. All batch ingredients are —325 mesh. The batch is formed into self-sustaining bars. These bars are fired at a temperature above 3000° F. for about 10 hours. The bars are then removed, cooled, crushed and subjected to magnetic separation and hand sorting to remove impurities.

It is, of course, understood that our purification method is only applicable to the stable refractory oxides of the rare earth group. Those which are radioactive and have extremely short half lives, or such highly active materials as actinium and radium oxide which apparently have never been isolated, would be outside our definition of a stable oxide.

Further, certain of the rare earth materials, which are mentioned under Example II above, in the mixture which was purified according to our methods also fail to have stable oxides above 3000° F. For example, praseodymium has an oxide which disassociates at room temperature. However, generally speaking, in a mixture of rare earth oxides such as tested under Example II, our method of purification does reduce certain impurities. Thus, it is feasible to purify rare earth compounds which do not melt below 3000° F.

It is usually desirable to isolate the bars from an oxidizing atmosphere during their firing. To this end we usually form a small hearth of high melting point material (periclase brick for example) internally of a kiln in which the bars are fired. This hearth is boxed in with walls and a top of more of the high melting point material.

In firing the zirconia bars, discussed above, we made a hearth of high purity (99+%) stabilized zirconia and built a high purity magnesia box about the bars on the zirconia hearth. This magnesia was 98% MgO. Further, the magnesia shapes did not touch any of the samples being fired.

Having thus described the invention in detail and with sufficient particularity as to enable those skilled in the art to practice it, what is desired to have protected by Letters Patent is set forth in the following claims.

We claim:

1. That method of treating the oxides from the group consisting of elements having the atomic numbers 39, 40, 51, 57, 58, 59, 60, 63, 64, 66, 70, 72, 73, 90 and 91 to remove impurities of at least the group consisting of elements having the atomic numbers 22, 23, 24, 25 and 26 which comprises the steps of reducing the oxides to a fine state of subdivision, intimately admixing this material with substantially equally finely divided mineralizer material, said mineralizer material capable of reacting with the elements of the group having the atomic numbers 23, 24, 25 and 26 to form eutectic which is mobile at an elevated temperature, forming the batch comprised of the mineralizer and the oxides to be purified into self-sustaining shapes, firing said shapes above said selected predetermined temperature and holding said temperature for a time period sufficient to drive said mobile eutectic centrally of said shapes, cooling said shapes, crushing the cooled shapes, and removing particles containing the cooled and solidified eutectic from the reduced bodies, and recovering treated oxides.

2. That method of treating the oxides from the group consisting of elements having the atomic numbers 39, 40, 51, 57, 58, 59, 60, 63, 64, 66, 70, 72, 73, 90 and 91 to remove impurities of at least the group consisting of elements having the atomic numbers 22, 23, 24, 25 and 26 which comprises the steps of reducing the oxides to a fine state of subdivision, intimately admixing this material with finely divided mineralizer material of the group calcia, magnesia, the inorganic salts of calcia and magnesia which decompose below about 2500° F., and calcium hydrate and magnesium hydrate forming the batch comprised of the mineralizer and the oxides to be purified into self-sustaining shapes, firing said shapes above a temperature and holding said temperature for a time period sufficient to cause reaction between the mineralizer and the impurities to form mobile eutectic and to drive said mobile eutectic centrally of said shapes, cooling said shapes, crushing the cooled shapes, and removing particles containing the cooled and solidified eutectic from the reduced bodies, and recovering treated oxides.

3. That method of treating material from the group consisting of the oxides of elements having the atomic numbers 39, 40, 51, 57, 58, 59, 60, 63, 64, 66, 70, 72, 73, 90 and 91 to remove impurities of at least the group consisting of elements having the atomic numbers 22, 23, 24, 25 and 26 which comprises the steps of intimately admixing this material with mineralizer material, said mineralizer material capable of reacting with the elements of the group having the atomic numbers 23, 24, 25 and 26 to form eutectic which is mobile at an elevated temperature, forming the batch comprised of the mineralizer and the oxides to be purified into self-sustaining shapes, firing said shapes above said temperature and holding said temperature for a time period sufficient to collect the mobile eutectic centrally of said shapes, removing the collected eutectic from the bodies, and recovering treated oxides.

4. That method of treating monoclinic zirconia to remove impurities of at least the group consisting of elements having the atomic numbers 22, 23, 24, 25 and 26 to recover purified cubic zirconia which comprises the steps of reducing the monoclinic zirconia to a fine state of subdivision, intimately admixing this material with finely divided mineralizer material, said mineralizer material capable of reacting with at least the elements of the group having the atomic numbers 23, 24, 25 and 26 to form eutectic which is mobile at an elevated temperature, forming the batch comprised of the mineralizer and the monoclinic zirconia into self-sustaining shapes, firing said shapes above said temperature and holding said temperature for a time period sufficient to collect said mobile eutectic centrally of said shapes, removing the collected eutectic from the reduced bodies, and recovering purified, cubic zirconia.

5. That method of treating the oxides from the group consisting of elements having the atomic numbers 39, 40, 51, 57, 58, 59, 60, 63, 64, 66, 70, 72, 73, 90, and 91 to remove impurities of at least the group consisting of elements having the atomic numbers 22, 23, 24, 25, and 26 which comprises the steps of reducing the oxides to a fine state of subdivision, intimately admixing that material with substantially equally finely divided mineralizer material, said mineralizer material capable of reacting with the elements of the group having the atomic numbers 23, 24, 25, and 26 to form eutectic which is mobile at a temperature in excess of 3000° F., forming the batch comprised of the mineralizer and the oxides to be purified into self-sustaining shapes, firing said shapes above said temperature and holding said temperature for a time period sufficient to drive said mobile eutectic centrally of shapes, cooling said shapes, crushing the cooled shapes, and removing particles containing the cooled and solidified eutectic from the reduced bodies, and recovering treated oxides.

6. That method of treating the oxides from the group consisting of elements having the atomic numbers 39, 40, 51, 57, 58, 59, 60, 63, 64, 66, 70, 72, 73, 90 and 91 to remove impurities of at least the group consisting of elements having the atomic numbers 22, 23, 24, 25, and 26 which comprises the steps of reducing the oxides to a fine state of subdivision, intimately admixing this material with a finely divided mineralizer material of the group calcia, magnesia, the inorganic salts of calcia and magnesia which decompose below about 2500° F., and calcium hydrate and magnesium hydrate forming the batch comprised of the mineralizer and the oxides to be purified into self-sustaning shapes, firing said shapes above a temperature in excess of 3000° F. and holding said temperature for a time period sufficient to cause reaction between the mineralizer and the impurities to form mobile eutectic and to drive said eutectic centrally of said shapes, cooling said shapes, crushing the cooled shapes, and removing particles containing the cooled and solidified eutectic from the reduced bodies, and recovering treated oxides.

7. That method of treating monoclinic zirconia to remove impurities of at least the group consisting of elements having the atomic numbers 22, 23, 24, 25, and 26 to recover purified cubic zirconia which comprises the steps of reducing the monoclinic zirconia to a fine state of subdivision, intimately admixing this material with finely divided mineralizer material of the group calcia, magnesia, the salts of calcia and magnesia which decompose below about 2500° F., and calcium hydrate and magnesium hydrate, said mineralizer material capable of reacting with at least the elements of the group having the atomic numbers 23, 24, 25, and 26 to form eutectic which is mobile at an elevated temperature, forming the batch comprised of the mineralizer and the monoclinic zirconia into self-sustaining shapes, firing said shapes above said temperature and holding said elevated temperature for a time period sufficient to collect said eutectic centrally of said shapes, removing the collected eutectic from the reduced bodies, and recovering purified, cubic zirconia.

8. That method of treating monoclinic zirconia to remove impurities of at least the group consisting of elements having the atomic numbers 22, 23, 24, 25, and 26 to recover purified cubic zirconia which comprises the steps of reducing the monoclinic zirconia to a fine state of subdivision, intimately admixing this material with finely divided mineralizer material of the group calcia, magnesia, the inorganic salts of calcia and magnesia which decompose below about 2500° F., and calcium hydrate and magnesium hydrate, said mineralizer material capable of reacting with at least the elements of the group having the atomic numbers 23, 24, 25, and 26 to form eutectic which is mobile at an elevated temperature, forming the batch comprised of the mineralizer and the monoclinic zirconia into self-sustaining shapes, firing said shapes above said temperature in excess of 3000° F. and holding said temperature for a time period sufficient to collect said mobile eutectic centrally of said shapes, removing the collected eutectic from the reduced bodies, and recovering purified, cubic zirconia.

No references cited.

CARL D. QUARFORTH, *Primary Examiner.*